United States Patent
Park et al.

(10) Patent No.: US 9,199,529 B2
(45) Date of Patent: Dec. 1, 2015

(54) POWER TRANSMISSION SYSTEM OF HYBRID ELECTRIC VEHICLE

(71) Applicant: Hyundai Motor Company, Seoul (KR)

(72) Inventors: Tae Sic Park, Busan (KR); Kwangmin Choi, Seoul (KR); Seok Joon Kim, Yongin-si (KR); Jun Hoi Huh, Hanam-si (KR)

(73) Assignee: Hyundai Motor Company, Seoul (KR)

( * ) Notice: Subject to any disclaimer, the term of this patent is extended or adjusted under 35 U.S.C. 154(b) by 57 days.

(21) Appl. No.: 14/139,797

(22) Filed: Dec. 23, 2013

(65) Prior Publication Data

US 2015/0105202 A1    Apr. 16, 2015

(30) Foreign Application Priority Data

Oct. 14, 2013    (KR) ........................ 10-2013-0122229

(51) Int. Cl.
*B60W 20/00* (2006.01)
*B60K 6/445* (2007.10)
*B60K 6/38* (2007.10)

(52) U.S. Cl.
CPC ........... *B60K 6/445* (2013.01); *B60K 2006/381* (2013.01); *Y10S 903/902* (2013.01)

(58) Field of Classification Search
CPC ............. F16H 3/44; F16H 3/72; F16H 3/725; F16H 3/727; F16H 3/728; B60K 6/26; B60K 6/365; B60W 10/18; B60W 20/00
See application file for complete search history.

(56) References Cited

U.S. PATENT DOCUMENTS

| | | | |
|---|---|---|---|
| 8,303,447 B1* | 11/2012 | Kim et al. ......................... | 475/5 |
| 2005/0070397 A1* | 3/2005 | Takasu et al. .................. | 475/254 |
| 2012/0052999 A1* | 3/2012 | Kim et al. ..................... | 475/149 |
| 2015/0099605 A1* | 4/2015 | Choi et al. ........................ | 477/5 |

FOREIGN PATENT DOCUMENTS

| | | |
|---|---|---|
| JP | 2009-166793 A | 7/2009 |
| KR | 10-2007-0079672 A | 8/2007 |
| KR | 10-2013-0017576 A | 2/2013 |

* cited by examiner

*Primary Examiner* — Huan Le
(74) *Attorney, Agent, or Firm* — Morgan, Lewis & Bockius LLP

(57) ABSTRACT

A power transmission system for a hybrid vehicle according to an exemplary embodiment of includes an input shaft through which torque from an engine, which is a power source, is inputted, first and second motor/generators that have the functions of both of a motor and a generator, as individual power sources, a planetary gear set that may be disposed on a line from the input shaft and includes a first rotating element directly connected with the first motor/generator and selectively connected to a transmission housing, a second rotating element directly connected with the input shaft and selectively connected to the transmission housing, and a third rotating element operating as an output element and connected with the second motor/generator, an output shaft that transmits torque from the planetary gear set and the second motor/generator to driving wheels through a differential, and a friction member disposed on the selective connecting portion.

16 Claims, 8 Drawing Sheets

FIG. 2

| mode | Brake 1 | Brake 2 | explanation |
|---|---|---|---|
| EV mode 1 | | | EV mode implemented (MG2 driven) |
| EV mode 2 | ● | | EV mode implemented (MG1+MG2 driven) |
| HEV mode 1 | | | input division type system structure |
| HEV mode 2 | | ● | high-speed fixed-stage gear implemented (OD) |

POWER TRANSMISSION SYSTEM OF HYBRID ELECTRIC VEHICLE

CROSS-REFERENCE TO RELATED APPLICATION

The present application claims priority to Korean Patent Application No. 10-2013-0122229 filed on Oct. 14, 2013, the entire contents of which is incorporated herein for all purposes by this reference.

BACKGROUND OF THE INVENTION

1. Field of the Invention

The present invention relates to a power transmission system of a hybrid vehicle. More particularly, the present invention relates to a power transmission system of a hybrid vehicle which can implement a fixed-stage gear in EV mode traveling and high-speed traveling by an electronic continuous variable transmission (E-CVT) and two motor/generators.

2. Description of Related Art

The environmentally-friendly technology for vehicles is a critical technology determining the fate of the future vehicle industry and the advanced automobile manufacturers have devoted all their strength to develop environmentally-friendly vehicles for satisfying the rules of environment and fuel efficiency.

Accordingly, the automobile manufacturers have developed an electric vehicle (EV), a hybrid electric vehicle (HEV), and a fuel cell electric vehicle (FCEV) for the future vehicle technology.

There are various technical limitations such as weight and cost in the future vehicles, such that the automobile manufacturers are interested in hybrid vehicles as an alternative plan of practical problems for satisfying regulations of exhaust gas and improving fuel efficiency, and are in keen competition with each other to put the vehicles to practical use.

Hybrid vehicles are vehicles using two or more energy sources (power sources) and may be implemented in various types, in which, generally, a gasoline engine or a diesel engine which generally uses fossil fuel as the power source in the related art and a motor/generator driven by electric energy are combined.

The hybrid vehicles use a motor/generator with relatively high low-speed torque characteristics as a main power source at a low speed and use an engine with relatively high high-speed torque characteristics as the main power source at a high speed.

Accordingly, the hybrid vehicles stops the engine using fossil fuel and uses the motor generator in a low speed range, such that they are advantageous in improving fuel efficiency and reducing exhaust gas.

The power transmission systems of the hybrid vehicles are different in durability, power transmission efficiency, and size in accordance with the connecting configurations, such that studies for achieving a compact power transmission system that is strong with a loss of power have been conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmission system of a hybrid vehicle having advantages of being able to function as an electronic continuous variable transmission (E-CVT) to achieve traveling at the optimum operation point of an engine, using power from an engine and a motor/generator with one planetary gear set and two friction members.

Further, various aspects of the present invention are directed to providing a power transmission system for a hybrid vehicle which can improve traveling speed in an EV mode by using two friction members and two motor/generators in EV mode traveling, can drive a vehicle with a fixed-stage gear implemented in high-speed traveling, can easily cope with a PHEV (Plug In Hybrid Electric Vehicle), and can increase the effect of upward-driving and fuel efficiency.

In an aspect of the present invention, a power transmission system for a hybrid vehicle, may include an input shaft through which a torque from an engine, which is a power source, is inputted, first and second motor/generators that may have the functions of both of a motor and a generator, as individual power sources, a planetary gear set that is disposed on a line from the input shaft and may include a first rotating element directly connected with the first motor/generator and selectively connected to a transmission housing, a second rotating element directly connected with the input shaft and selectively connected to the transmission housing, and a third rotating element operating as an output element and connected with the second motor/generator, an output shaft that transmits torque from the third rotating element of the planetary gear set and the second motor/generator to driving wheels through a differential, and a friction member disposed on a selective connecting portion.

The planetary gear set is a single pinion planetary gear set, in which the first rotating element is a sun gear, the second rotating element is a planetary carrier, and the third rotating element is a ring gear.

The planetary gear set is a double pinion planetary gear set, in which the first rotating element is a sun gear, the second rotating element is a ring gear, and the third rotating element is a planetary carrier.

The friction member may include a first brake disposed between the second rotating element of the planetary gear set and the transmission housing, and a second brake disposed between the first rotating element of the planetary gear set and the transmission housing.

The first and second brakes are stopped in an EV model, wherein the first brake is operated in an EV mode 2, wherein the first and second brakes are stopped in an HEV mode 1, and wherein the second brake is operated in an HEV mode 2.

A clutch is disposed on the output shaft connecting the third rotating element of the planetary gear set and the second motor/generator.

The clutch is controlled to operate in the EV mode 2, the HEV mode 1, and the HEV mode 2.

In another aspect of the present invention, a power transmission system for a hybrid vehicle, may include an input shaft through which a torque from an engine, which is a power source, is inputted, first and second motor/generators that may have the functions of both of a motor and a generator, as individual power sources, a planetary gear set that is a single pinion planetary gear set and disposed on a line from the input shaft, and may include a sun gear directly connected with the first motor/generator and selectively connected to a transmission housing, a planetary carrier directly connected with the input shaft and selectively connected to the transmission housing, and a ring gear operating as an output element and connected with the second motor/generator, an output shaft that transmits torque from the third rotating element of the planetary gear set and the second motor/generator to driving wheels, a first brake disposed between the planetary carrier and the transmission housing, and a second brake disposed between the sun gear and the transmission housing, wherein the system implements an EV mode 1, an EV mode 2, an HEV mode 1, and an HEV mode 2.

The first brake operates in the EV mode 2 and the second brake operations in the HEV mode 2.

A clutch is disposed on the output shaft connecting the ring gear of the planetary gear set and the second motor/generator.

The clutch is controlled to operation in the EV mode 2, the HEV mode 1, and the HEV mode 2.

In further another aspect of the present invention, a power transmission system for a hybrid vehicle, may include an input shaft through which a torque from an engine, which is a power source, is inputted, first and second motor/generators that may have the functions of both of a motor and a generator, as individual power sources, a planetary gear set that is a single pinion planetary gear set and disposed on a line from the input shaft, and may include a sun gear directly connected with the first motor/generator and selectively connected to a transmission housing, a planetary carrier directly connected with the input shaft and selectively connected to the transmission housing, and a ring gear operating as an output element and selectively connected with the second motor/generator, an output shaft that transmits torque from the ring gear of the planetary gear set and the second motor/generator to driving wheels, a clutch disposed on the output shaft between the ring gear and the second motor/generator, a first brake disposed between the planetary carrier and the transmission housing, and a second brake disposed between the sun gear and the transmission housing, wherein the system implements an EV mode 1, an EV mode 2, an HEV mode 1, and an HEV mode 2.

The first brake operates in the EV mode 2 and the second brake operation in the HEV mode 2.

The clutch is controlled to operate in the EV mode 2, the HEV mode 1, and the HEV mode 2.

In another aspect of the present invention, a power transmission system for a hybrid vehicle, may include an input shaft through which a torque from an engine, which is a power source, is inputted, first and second motor/generators that may have the functions of both of a motor and a generator, as individual power sources, a planetary gear set that is a double pinion planetary gear set and disposed on a line from the input shaft, and may include a sun gear directly connected with the first motor/generator and selectively connected to a transmission housing, a ring gear directly connected with the input shaft and selectively connected to the transmission housing, and a planetary carrier operating as an output element and connected with the second motor/generator, an output shaft disposed in parallel with the input shaft at a predetermined distance and transmitting torque from the planetary carrier and the second motor/generator to driving wheels through a differential, a first brake disposed between the ring gear and the transmission housing, and a second brake disposed between the sun gear and the transmission housing, wherein the system implements an EV mode 1, an EV mode 2, an HEV mode 1, and an HEV mode 2.

In the output shaft, an input gear mounted at a front end of the output shaft is externally engaged with an output gear formed around a connecting portion connecting the planetary carrier and the second motor/generator.

The first brake operates in the EV mode 2 and the second brake operations in the HEV mode 2.

According to an exemplary embodiment of the present invention, it is possible to drive a vehicle at a high speed by implementing EV mode traveling and a fixed-stage gear with two motor/generators, using two brakes.

Further, it is possible to use the driving torque from both of two motor/generators in the EV mode, such that it is possible to improve traveling and upward-driving ability in addition to fuel efficiency.

Further, it is possible to improve fuel efficiency by implementing a fixed-stage gear even in high-speed traveling.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table for each operation mode of a friction member used in the power transmission system according to the various exemplary embodiments of the present invention.

Figure 1:
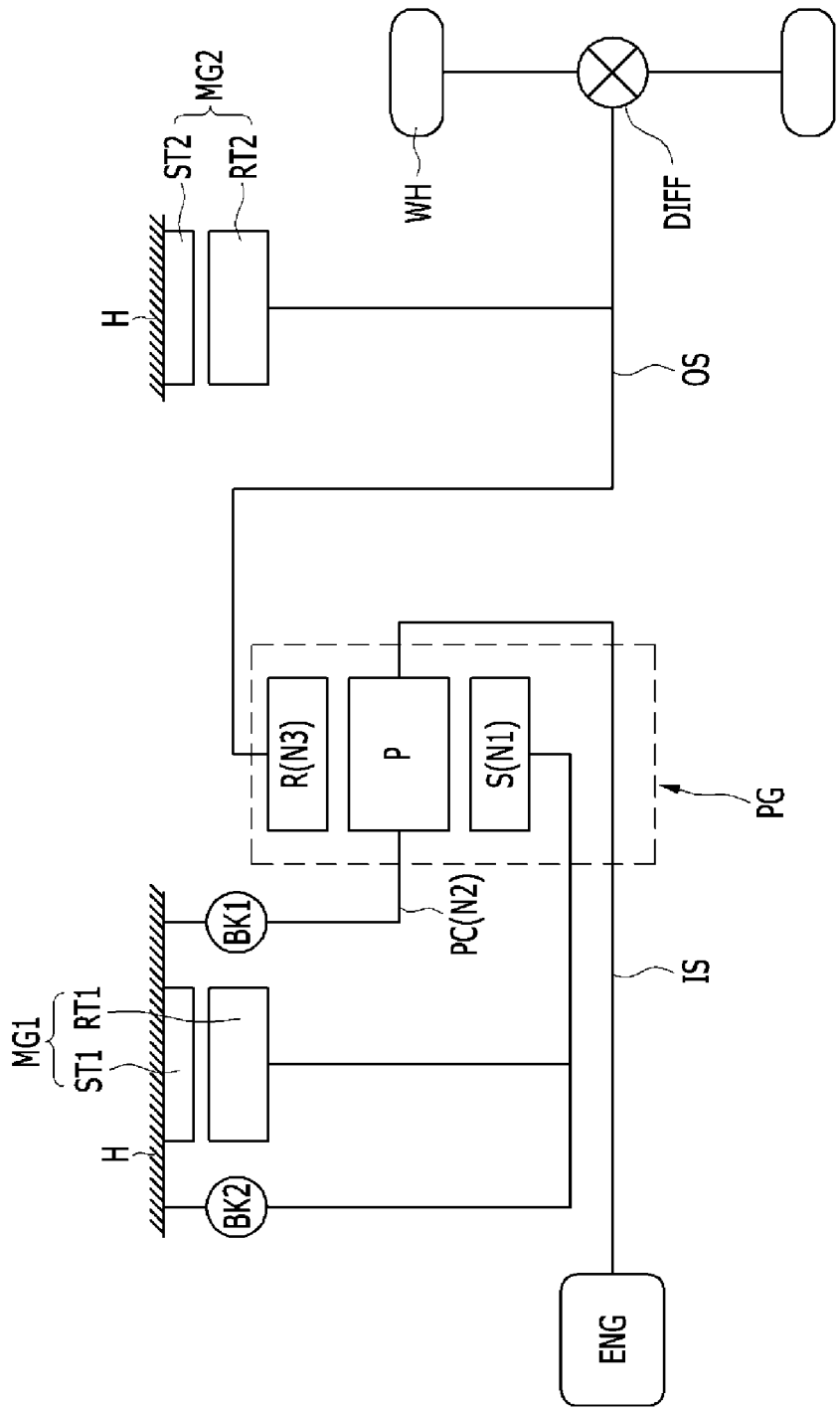
FIG. 1 is a schematic diagram illustrating the configuration of a power transmission system according to various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

The parts that are not related to the description of the exemplary embodiments are not shown to make the description clear and like reference numerals designate like element throughout the specification.

Using the terms of the first and the second etc. is for discriminating the components having the same name and they are not limited to the order.

FIG. 1 is a schematic diagram illustrating the configuration of a power transmission system according to a first exemplary embodiment of the present invention.

Referring to FIG. 1, a power transmission system of a hybrid vehicle according to the first exemplary embodiment of the present invention shifting the power from an engine ENG and first and second motor/generators MG1 and MG2, which are power sources, in accordance with the traveling states of a vehicle, and outputs it through an output shaft OS.

The power transmission system includes the engine ENG, the first motor/generator MG1, the second motor generator MG2, a planetary gear set PG, and two friction members BK1 and BK2.

The engine is a power source in this configuration and is a gasoline engine or a diesel engine using fossil fuel in the related art.

The first motor generator MG1 and the second motor/generator MG2, which are individual power sources, have the functions of both a motor and a generator.

The first motor/generator MG1 includes a first rotor RT1 and a first stator ST1, in which the first rotor RT1 is directly connected with any one of the rotating elements of the planetary gear set PG and operates as a start motor for starting the engine, or functions as a generator that generates electricity while traveling by torque transmitted from the engine through the rotating element, and the first stator ST1 is fixed to a transmission housing H.

The second motor/generator MG2 includes a second rotor RT2 and a second stator ST2, in which the second rotor RT2 is directly connected with an output shaft OS, so that the second motor/generator MG2 can be used as a main power source in an EV mode and as an auxiliary power source in an HEV mode, and the second stator ST2 is fixed to the transmission housing.

That is, the first and second motor/generators MG1 and MG2 generate a driving torque in the EV mode in which the vehicle is driven only by a motor in starting of a vehicle or low-speed and stop ranges, supplement the engine power in the HEV mode, and function as generators converting reduction energy into electric energy in decelerating or braking.

The output shaft OS is connected with a differential DIFF, which is well known in the art, and the differential DIFF drives driving wheels WH in accordance with the input itself or differentially, in accordance with traveling conditions.

The planetary gear set PG, a single pinion planetary gear set, includes a sun gear S (first rotating element), a planetary carrier PC (second rotating element) rotatably supporting a pinion P externally engaged with the sun gear S, and a ring gear R (third rotating element) internally engaged with the pinion P.

The sun gear S1, a first rotating element N1, is connected with the first rotor RT1 of the first generator MG1 and selectively connected with the transmission housing H.

The planetary carrier PC, a second rotating element N2, is directly connected with an input shaft IS such that the torque from the engine ENG is directly inputted, and is selectively connected with the transmission housing H.

The ring gear R, a third rotating element N3, is directly connected with the output shaft OS and functions as an output element.

The two friction members are two brakes BK1 and BK2, in which the first brake BK1 is disposed between the planetary carrier PC that is the second rotating element N2 and the transmission housing H such that the second rotating element N2 can function as a selective fixing element.

The second brake BK2 is disposed between the sun gear S that is the first rotating element N1 and the transmission housing H such that the first rotating element N1 can function as a selective fixing element.

In this configuration, the friction members of the first and second brakes BK1 and BK2 are multi-plate hydraulic friction-coupling units that are frictionally coupled by hydraulic pressure, or may be dry friction-coupling units.

FIG. 2 is an operation table for each traveling mode of a friction member used in the power transmission system according to the first exemplary embodiment of the present invention.

Referring to FIG. 2, both of the first and second brakes BK1 and BK2 are not operated in the EV mode 1, the first brake BK1 operates in the EV mode 2, both of the first and second brakes BK1 and BK2 are not operated in the HEV mode 1, and the second brake BK2 operates in the HEV mode 2.

Figure 3:
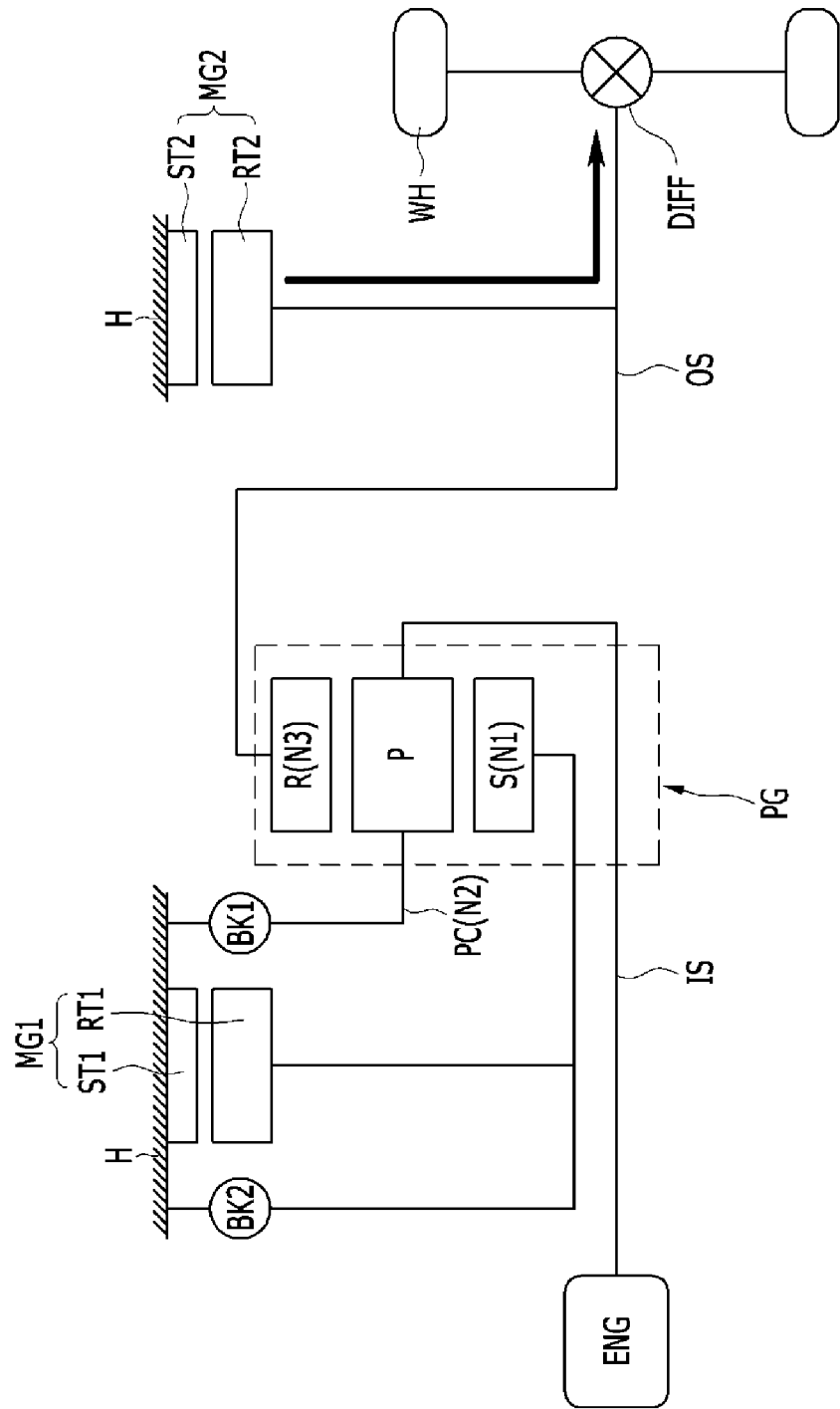
FIG. 3 is a diagram showing a power transmission path in an EV mode 1 and illustrating the configuration of the power transmission system according to the various exemplary embodiments of the present invention.

FIG. 3 is a diagram showing a power transmission path in an EV mode 1 and illustrating the configuration of the power transmission system according to the first exemplary embodiment of the present invention.

Referring to FIG. 3, in the EV mode 1 in which a vehicle is driven only by a motor in staring of the vehicle or the low-speed and stop ranges, both of the first and second brakes BK1 and BK2 are not operated, as in FIG. 2.

Accordingly, the driving torque of the second motor/generator MG2 using the power of a battery B as an energy source is transmitted to the driving wheels WH through the differential, such that the vehicle travels in the EV mode 1.

In this process, the engine ENG is in stop and the first motor/generator MG1 is in a non-load rotation with zero torque.

In order to start the engine ENG in the EV mode 1, the first motor/generator MG1 operates the engine ENG at an RPM where it can start, and then starts the engine.

Figure 4:
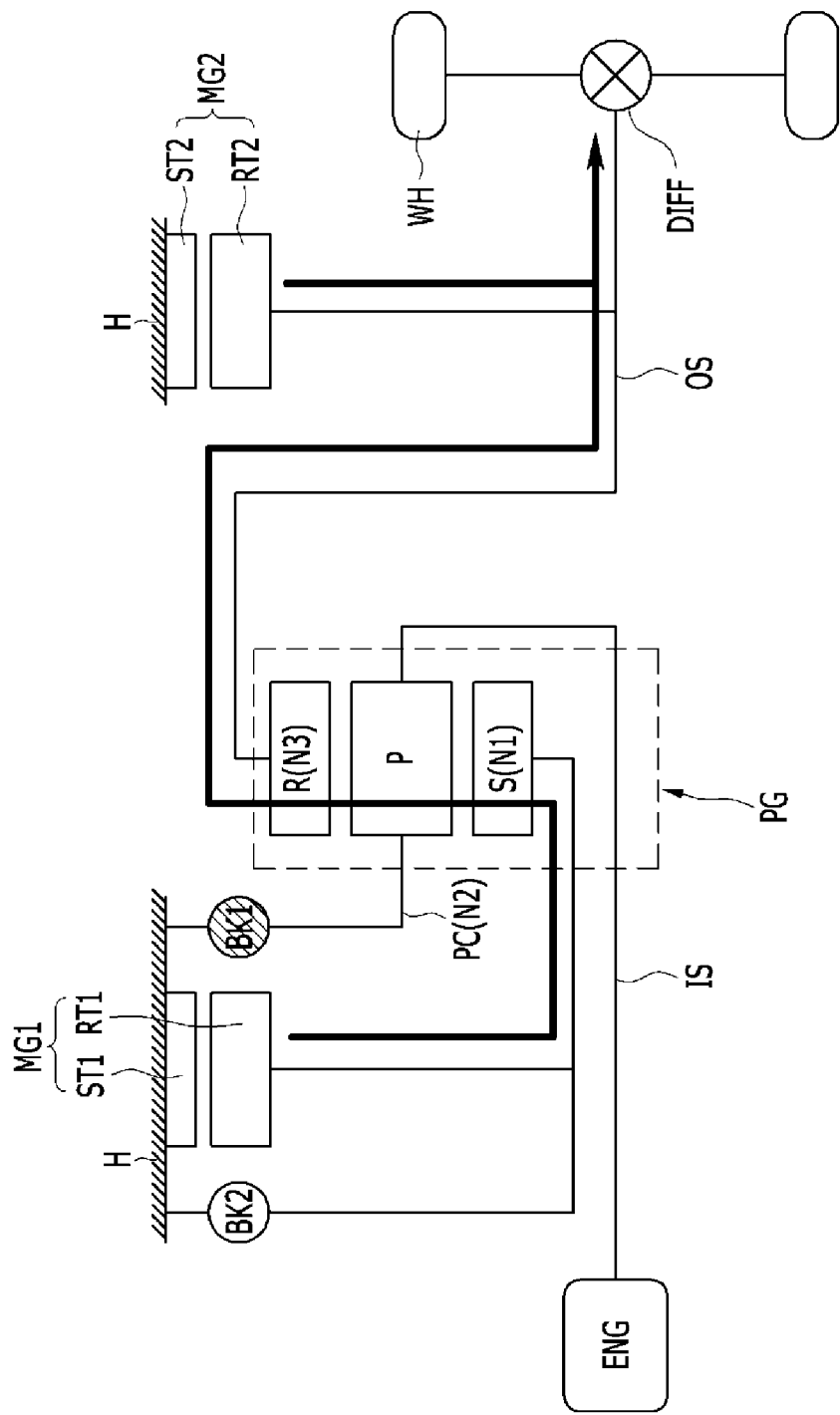
FIG. 4 is a diagram showing a power transmission path in an EV mode 2 and illustrating the configuration of the power transmission system according to the various exemplary embodiments of the present invention.

FIG. 4 is a diagram showing a power transmission path in an EV mode 2 and illustrating the configuration of the power transmission system according to the first exemplary embodiment of the present invention.

Referring to FIG. 4, when excessive load is applied to the second motor/generator MG2 due to the road conditions or the vehicle speed and torque is insufficient in the traveling state in the EV mode 1, the first brake BK1 is operated so that the vehicle travels in the EV mode 2.

Accordingly, both of the first and second motor/generators MG1 and MG2 can be used as power sources, and when turning off the EV mode 2, it is possible to minimize shock due to mode conversion by stopping the first brake BK1 after concentrating the torque, which is distributed to the first motor/generator MG1 and the second generator MG2, on the second generator MG2.

Figure 5:
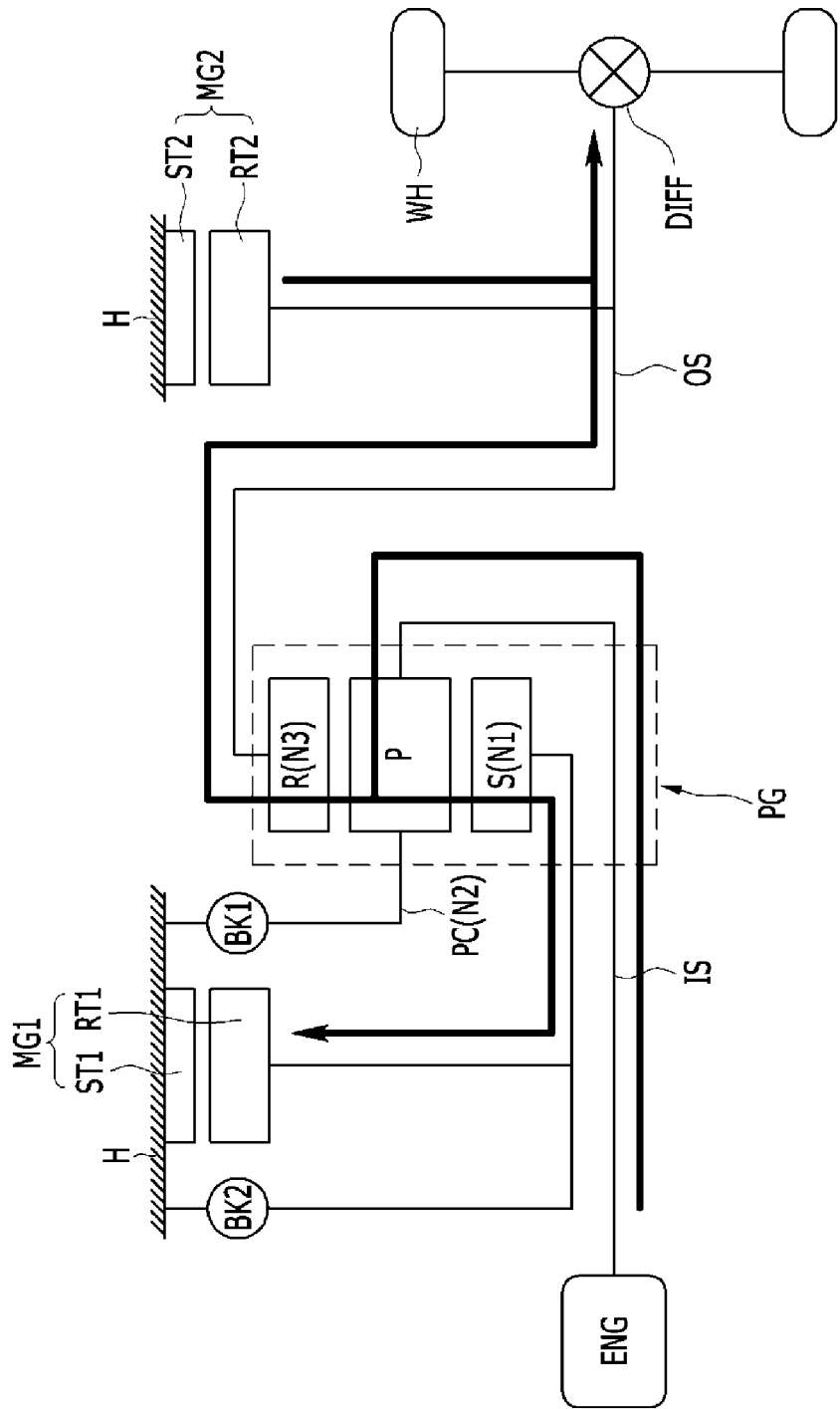
FIG. 5 is a diagram showing a power transmission path in an HEV mode 1 and illustrating the configuration of the power transmission system according to the various exemplary embodiments of the present invention.

FIG. 5 is a diagram showing a power transmission path in an HEV mode 1 and illustrating the configuration of the power transmission system according to the first exemplary embodiment of the present invention.

Referring to FIG. 5, the HEV mode 1 is implemented after the engine ENG is started, in which the first motor/generator MG1 and the second motor generator MG2 operate as a generator and a motor, respectively, and are controlled to be able to be driven at the optimum operation point of the electronic continuous variable transmission (E-CVT), that is, the engine ENG.

In this process, the second motor/generator MG2 supplements the power of the engine ENG usually as a motor, because it is directly connected with output.

Figure 6:
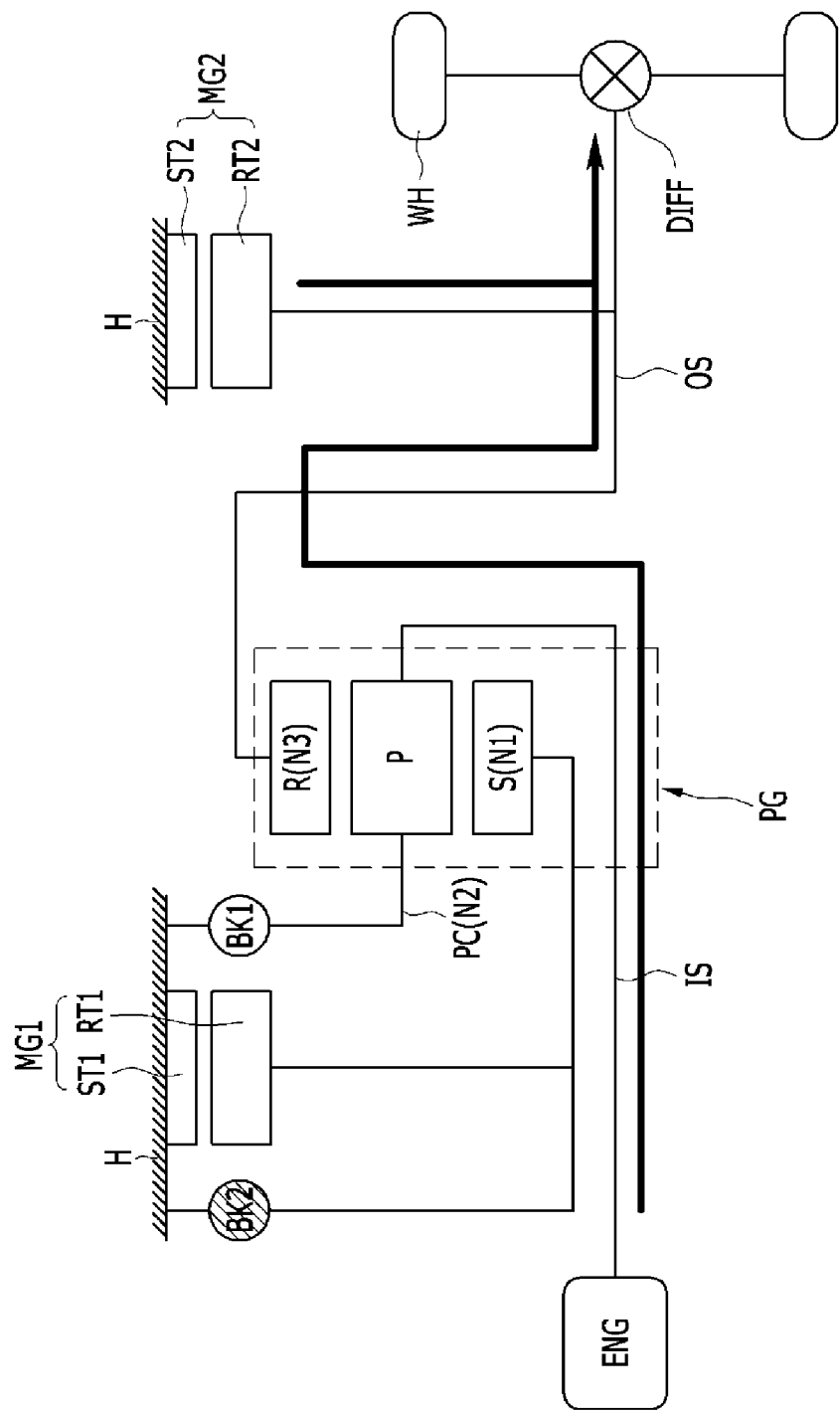
FIG. 6 is a diagram showing a power transmission path in an HEV mode 2 and illustrating the configuration of the power transmission system according to the various exemplary embodiments of the present invention.

FIG. 6 is a diagram showing a power transmission path in an HEV mode 2 and illustrating the configuration of the power transmission system according to the first exemplary embodiment of the present invention.

Referring to FIG. 6, when the speed of the first motor/generator MG1 is controlled at 0 rpm or less due to high-speed traveling in the HEV mode 1, the second brake BK2 operates and the mode changes into the HEV mode 2 in order to minimize a loss of energy due to the driving of the first motor/generator MG1.

In this process, the engine ENG is directly driven without the first motor/generator MG1 controlled and the second motor/generator MG2 can control charging and discharging torque for efficient control of the engine ENG.

As described above, the power transmission apparatus according to the first exemplary embodiment uses the power from the engine ENG and two motor/generators MG1 and MG2 with one planetary gear set PG and two brakes BK1 and BK2, implements traveling at the optimum operation point of the engine ENG and can function as an electronic continuous variable transmission (E-CVT).

Further, by using two motor/generators in the EV mode traveling with two brakes BK1 and BK2, it is possible to increase the traveling speed in the EV mode and to drive with a fixed-stage gear implemented in the HEV mode 2 in high-speed traveling, such that it is possible to cope with a PHEV and increase the effect of improving upward-driving ability and fuel efficiency.

Figure 7:
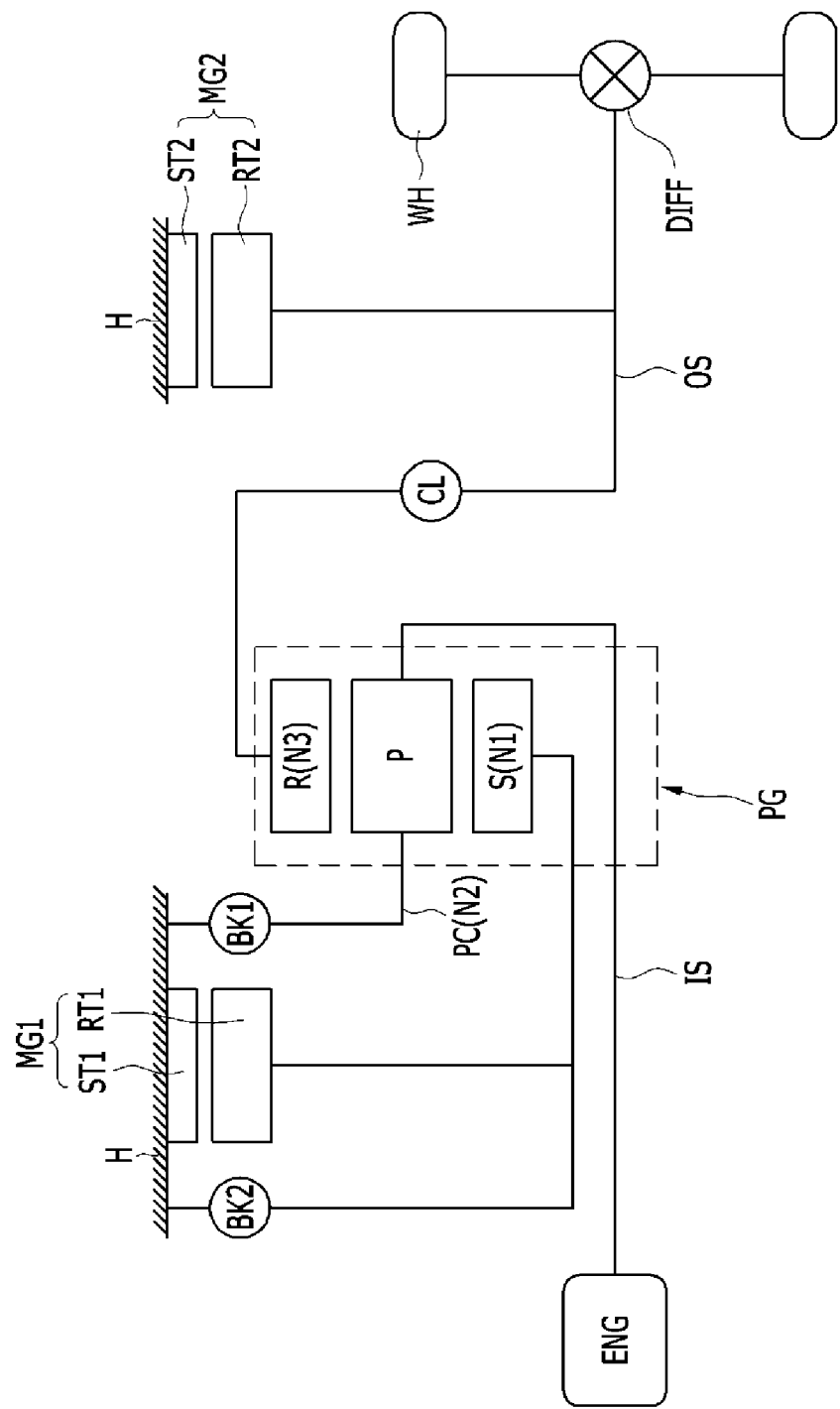
FIG. 7 is a schematic diagram illustrating the configuration of a power transmission system according to various exemplary embodiments of the present invention.

FIG. 7 is a schematic diagram illustrating the configuration of a power transmission system according to a second exemplary embodiment of the present invention.

Referring to FIG. 7, the second exemplary embodiment is different from the first exemplary embodiment in that a clutch CL is disposed on the output OS connecting the third rotating element N3 of the planetary gear set PG and the second motor/generator MG2.

When driven by the driving torque from the second motor/generator MG2 in the EV mode 1, the clutch CL prevents a loss of driving torque from the second motor/generator MG2 by disengaging the second motor/generator MG2 and the planetary gear set PG.

As described above, as compared with the first exemplary embodiment, the second exemplary embodiment is the same in other configurations, operations, and effect, except that there is a clutch CL or not, so the detailed description is not provided.

Figure 8:
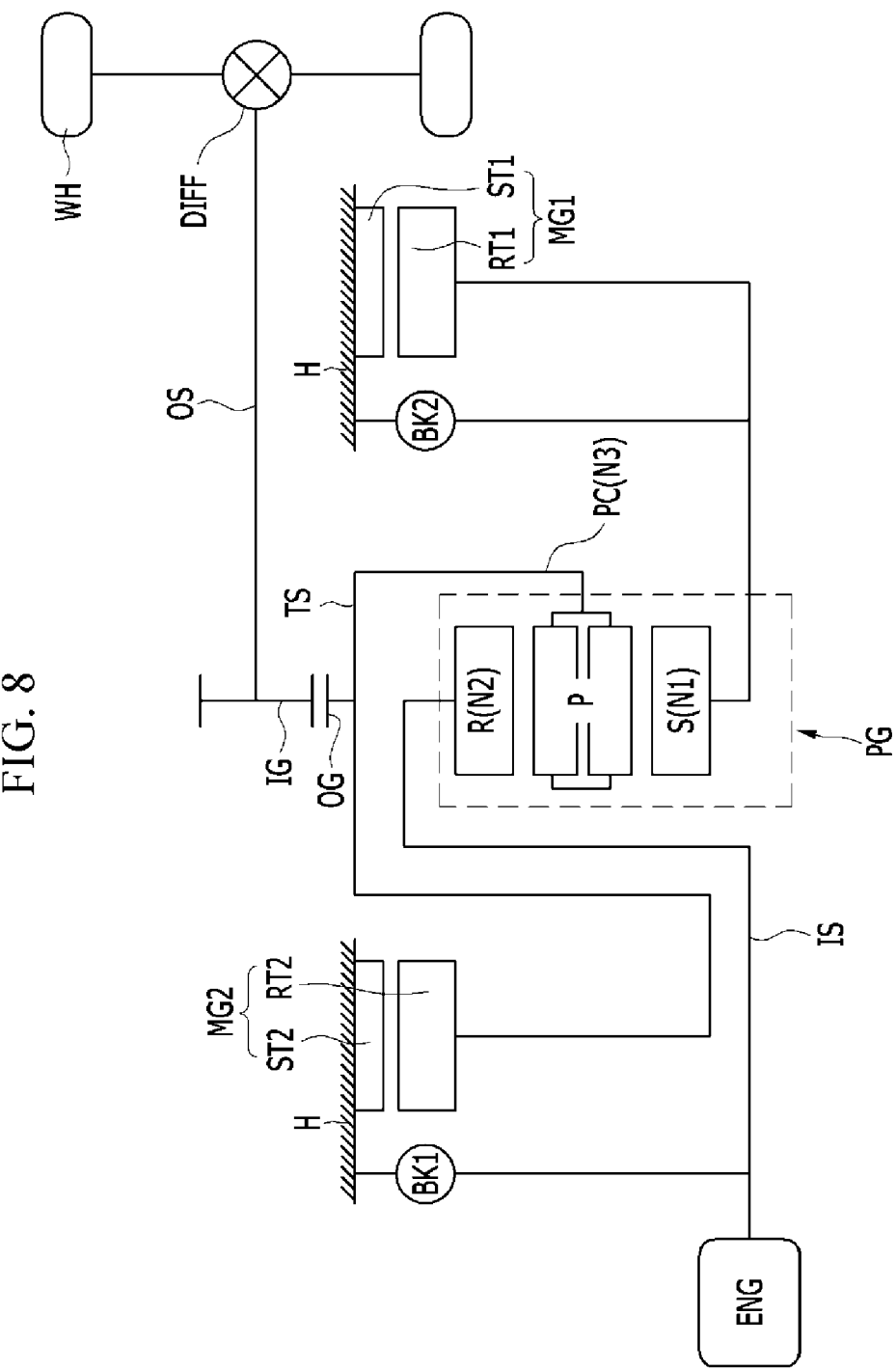
FIG. 8 is a schematic diagram illustrating the configuration of a power transmission system according to various exemplary embodiments of the present invention.

FIG. 8 is a schematic diagram illustrating the configuration of a power transmission system according to a third exemplary embodiment of the present invention.

Referring to FIG. 8, although the planetary gear set PG is a single pinion planetary gear set in the first exemplary embodiment, the third exemplary embodiment is different in that a double pinion planetary gear set is used.

Accordingly, unlike the first exemplary embodiment, the second rotating element N2 is a ring gear R and the third rotating element N3 is a planetary carrier PC.

Due to the changes of the rotating elements, the output shaft OS is not directly connected to the planetary carrier PC and the second motor/generator MG and is disposed in parallel with the input shaft IS.

Accordingly, an input gear IG formed at the front end of the output shaft OS is externally engaged with an output gear OG formed on a connecting member TS connecting the planetary carrier PC and the second motor/generator MG2.

As described above, in comparison to the first exemplary embodiment, in the third exemplary embodiment, the planetary gear set PG is changed to a double pinion planetary gear set and the output shaft OS is individually configured, but the other operations and effects are the same, so the detailed description is not provided.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A power transmission system for a hybrid vehicle, comprising:
   an input shaft through which a torque from an engine, which is a power source, is inputted;
   first and second motor/generators that have the functions of both of a motor and a generator, as individual power sources;
   a planetary gear set that is disposed on a line from the input shaft and includes:
      a first rotating element directly connected with the first motor/generator and selectively connected to a transmission housing;
      a second rotating element directly connected with the input shaft and selectively connected to the transmission housing; and
      a third rotating element operating as an output element and connected with the second motor/generator;
   an output shaft that transmits torque from the third rotating element of the planetary gear set and the second motor/generator to driving wheels through a differential; and
   a friction member disposed on a selective connecting portion,
   wherein the friction member includes:
      a first brake disposed between the second rotating element of the planetary gear set and the transmission housing; and
      a second brake disposed between the first rotating element of the planetary gear set and the transmission housing,
   wherein the first and second brakes are released in an EV model,
   wherein the first brake is operated in an EV mode 2, wherein the first and second brakes are released in an HEV mode 1, and wherein the second brake is operated in an HEV mode 2.

2. The system of claim 1, wherein the planetary gear set is a single pinion planetary gear set, in which the first rotating element is a sun gear, the second rotating element is a planetary carrier, and the third rotating element is a ring gear.

3. The system of claim 1, wherein the planetary gear set is a double pinion planetary gear set, in which the first rotating element is a sun gear, the second rotating element is a ring gear, and the third rotating element is a planetary carrier.

4. The system of claim 1, wherein a clutch is disposed on the output shaft connecting the third rotating element of the planetary gear set and the second motor/generator.

5. The system of claim 4, wherein the clutch is controlled to operate in the EV mode 2, the HEV mode 1, and the HEV mode 2.

6. A power transmission system for a hybrid vehicle, comprising:
- an input shaft through which a torque from an engine, which is a power source, is inputted;
- first and second motor/generators that have the functions of both of a motor and a generator, as individual power sources;
- a planetary gear set that is a single pinion planetary gear set and disposed on a line from the input shaft, and includes:
  - a sun gear directly connected with the first motor/generator and selectively connected to a transmission housing;
  - a planetary carrier directly connected with the input shaft and selectively connected to the transmission housing; and
  - a ring gear operating as an output element and connected with the second motor/generator;
- an output shaft that transmits torque from the ring gear of the planetary gear set and the second motor/generator to driving wheels;
- a first brake disposed between the planetary carrier and the transmission housing; and
- a second brake disposed between the sun gear and the transmission housing, wherein the system implements an EV mode 1, an EV mode 2, an HEV mode 1, and an HEV mode 2,
wherein the first brake operates in the EV mode 2 and the second brake operates in the HEV mode 2.

7. The system of claim 6, wherein a clutch is disposed on the output shaft connecting the ring gear of the planetary gear set and the second motor/generator.

8. A power transmission system for a hybrid vehicle, comprising:
- an input shaft through which a torque from an engine, which is a power source, is inputted;
- first and second motor/generators that have the functions of both of a motor and a generator, as individual power sources;
- a planetary gear set that is a single pinion planetary gear set and disposed on a line from the input shaft, and includes:
  - a sun gear directly connected with the first motor/generator and selectively connected to a transmission housing;
  - a planetary carrier directly connected with the input shaft and selectively connected to the transmission housing; and
  - a ring gear operating as an output element and selectively connected with the second motor/generator;
- an output shaft that transmits torque from the ring gear of the planetary gear set and the second motor/generator to driving wheels;
- a clutch disposed on the output shaft between the ring gear and the second motor/generator;
- a first brake disposed between the planetary carrier and the transmission housing; and
- a second brake disposed between the sun gear and the transmission housing,
wherein the system implements an EV mode 1, an EV mode 2, an HEV mode 1, and an HEV mode 2.

9. The system of claim 8, wherein the first brake operates in the EV mode 2 and the second brake operation in the HEV mode 2.

10. The system of claim 8, wherein the clutch is controlled to operate in the EV mode 2, the HEV mode 1, and the HEV mode 2.

11. A power transmission system for a hybrid vehicle, comprising:
- an input shaft through which a torque from an engine, which is a power source, is inputted;
- first and second motor/generators that have the functions of both of a motor and a generator, as individual power sources;
- a planetary gear set that is a double pinion planetary gear set and disposed on a line from the input shaft, and includes:
  - a sun gear directly connected with the first motor/generator and selectively connected to a transmission housing;
  - a ring gear directly connected with the input shaft and selectively connected to the transmission housing; and
  - a planetary carrier operating as an output element and connected with the second motor/generator;
- an output shaft disposed in parallel with the input shaft at a predetermined distance and transmitting torque from the planetary carrier and the second motor/generator to driving wheels through a differential;
- a first brake disposed between the ring gear and the transmission housing; and
- a second brake disposed between the sun gear and the transmission housing,
wherein the system implements an EV mode 1, an EV mode 2, an HEV mode 1, and an HEV mode 2.

12. The system of claim 11, wherein in the output shaft, an input gear mounted at a front end of the output shaft is externally engaged with an output gear formed around a connecting portion connecting the planetary carrier and the second motor/generator.

13. The system of claim 11, wherein the first brake operates in the EV mode 2 and the second brake operations in the HEV mode 2.

14. A power transmission system for a hybrid vehicle, comprising:
- an input shaft through which a torque from an engine, which is a power source, is inputted;
- first and second motor/generators that have the functions of both of a motor and a generator, as individual power sources;
- a planetary gear set that is disposed on a line from the input shaft and includes:
  - a first rotating element directly connected with the first motor/generator and selectively connected to a transmission housing;

a second rotating element directly connected with the input shaft and selectively connected to the transmission housing; and
a third rotating element operating as an output element and connected with the second motor/generator;
an output shaft that transmits torque from the third rotating element of the planetary gear set and the second motor/generator to driving wheels through a differential; and
a friction member disposed on a selective connecting portion,
wherein a clutch is disposed on the output shaft connecting the third rotating element of the planetary gear set and the second motor/generator,
wherein the clutch is controlled to operate in an EV mode 2, an HEV mode 1, and an HEV mode 2.

15. A power transmission system for a hybrid vehicle, comprising:
an input shaft through which a torque from an engine, which is a power source, is inputted;
first and second motor/generators that have the functions of both of a motor and a generator, as individual power sources;
a planetary gear set that is disposed on a line from the input shaft and includes:
a first rotating element directly connected with the first motor/generator and selectively connected to a transmission housing;
a second rotating element directly connected with the input shaft and selectively connected to the transmission housing; and
a third rotating element operating as an output element and connected with the second motor/generator;
an output shaft that transmits torque from the third rotating element of the planetary gear set and the second motor/generator to driving wheels through a differential; and
a friction member disposed on a selective connecting portion,
wherein a clutch is disposed on the output shaft connecting the third rotating element of the planetary gear set and the second motor/generator.

16. The system of claim 15, wherein the clutch is controlled to operation operate in an EV mode 2, an HEV mode 1, and an HEV mode 2.

* * * * *